Oct. 9, 1951 S. VAN MIERLO 2,570,294

FREQUENCY SELECTIVE NETWORK ARRANGEMENT

Filed July 25, 1947 5 Sheets-Sheet 1

INVENTOR
STANISLAS VAN MIERLO
BY
Robert Harding Jr.
ATTORNEY

Oct. 9, 1951 S. VAN MIERLO 2,570,294

FREQUENCY SELECTIVE NETWORK ARRANGEMENT

Filed July 25, 1947 5 Sheets-Sheet 2

INVENTOR
STANISLAS VAN MIERLO
BY Robert Harding Jr.
ATTORNEY

INVENTOR
STANISLAS VAN MIERLO
BY Robert Harding Jr.
ATTORNEY

FREQUENCY SELECTIVE NETWORK ARRANGEMENT

INVENTOR
STANISLAS VAN MIERLO
BY Robert Harding Jr.
ATTORNEY

Oct. 9, 1951 S. VAN MIERLO 2,570,294

FREQUENCY SELECTIVE NETWORK ARRANGEMENT

Filed July 25, 1947 5 Sheets-Sheet 5

INVENTOR
STANISLAS VAN MIERLO

BY Robert Harding Jr.

ATTORNEY

Patented Oct. 9, 1951 2,570,294

UNITED STATES PATENT OFFICE 2,570,294

FREQUENCY SELECTIVE NETWORK ARRANGEMENT

Stanislas Van Mierlo, Paris, France, assignor to International Standard Electric Corporation, New York, N. Y., a corporation of Delaware Application July 25, 1947, Serial No. 763,573
In Switzerland June 2, 1945

Section 1, Public Law 690, August 8, 1946
Patent expires June 2, 1965

8 Claims. (Cl. 179—171)

The present invention relates to an electrical arrangement comprising at least one amplifier in series with at least one 4-terminal network, said amplifier and said network being together shunted by a 4-terminal network providing a feedback circuit.

In a preferred embodiment of this arrangement the amplifier provides a fixed amplification without phase variation in a frequency band of interest and the first 4-terminal network provides an attenuation varying with frequency and the second 4-terminal network a constant attenuation without phase shift and a negative feedback.

The arrangement according to the present invention permits to obtain more easily than other known negative feedback amplifiers a uniform amplification for all frequencies with the exception of those which one desires to attenuate. In fact in an ordinary negative feedback amplifier the shape of the characteristic depends first of all and for all frequencies upon the attenuation of the negative feedback circuit, whereas in the present case the negative feedback maintains constant the output level except for the frequencies for which the 4-terminal network in series with the amplifier produces a high attenuation. In this way very abrupt variations of the amplification of the whole circuit may be obtained.

The present description shows in particular the features of this arrangement by taking for the first 4-terminal network a bridging circuit, composed of resistances and capacities.

For the whole arrangement a filter characteristic for eliminating a very small frequency band adjustable in frequency and shape may be obtained. Furthermore as all the elements which may influence this characteristic consist of resistances and capacities, it is possible to obtain by employing a stabilised amplifier a substantially unvariable characteristic in spite of temperature or supply current variations.

Figure 1:
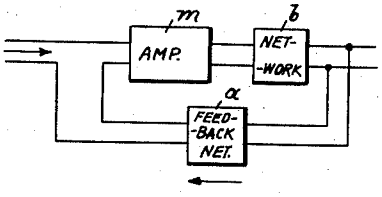
Figure 2:
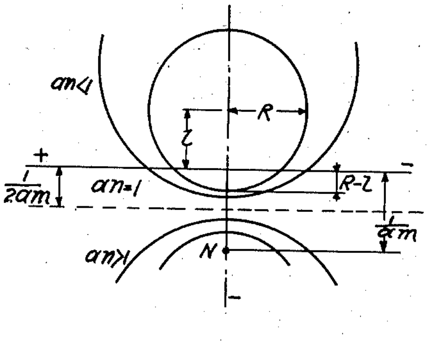
Figure 4:
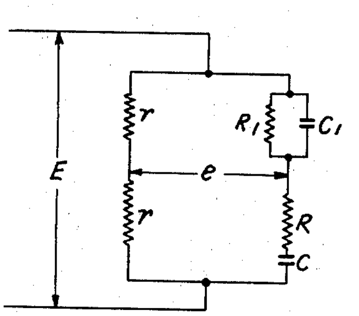
Figure 5:
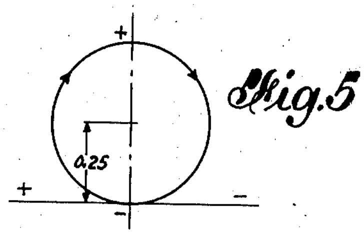
Figure 9A:
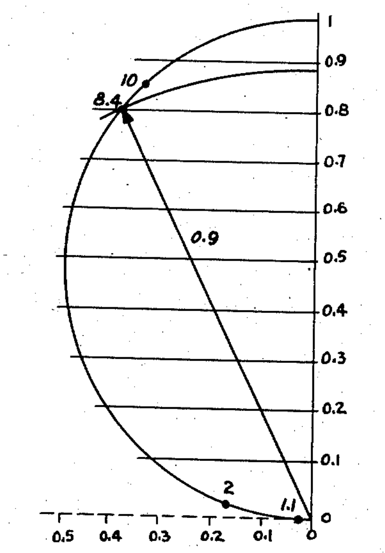
Figure 9B:
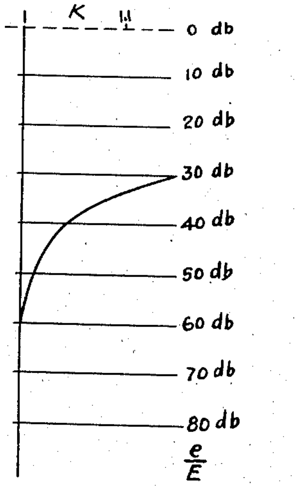
Figure 10:
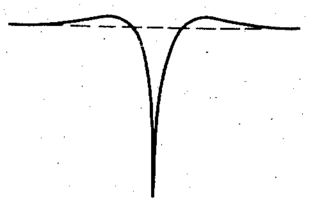
Figure 11:
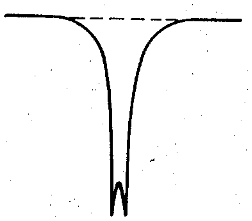
Figure 3:
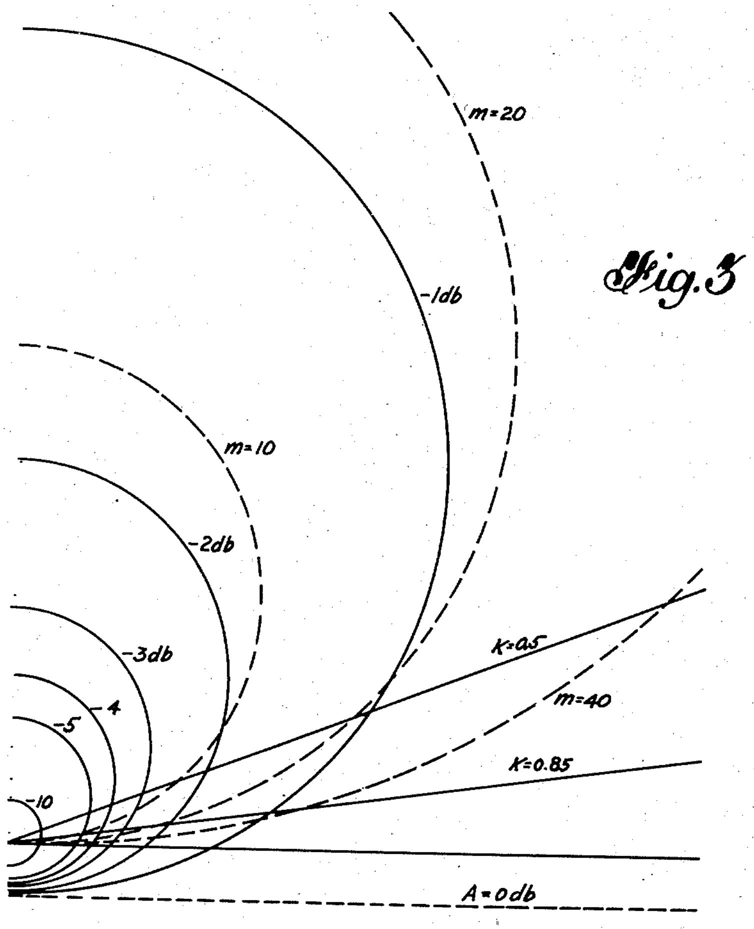

Embodiments of the invention given by way of example are now more fully explained in the description in conjunction with the drawings, in which Fig. 1 shows a schematic diagram of the arrangement according to the invention, Figs. 2 and 3 show polar diagrams giving the attenuation of the circuit versus the parameters of the series 4-terminal network, Fig. 4 shows the schematic diagram of a bridge circuit consisting of resistances and capacities, Figs. 5, 9*a* and 9*b* show polar diagrams illustrating an attenuation of the RC-bridge versus frequency, Figs. 6*a*, 6*b*, 7*a*, 7*b*, 8*a* and 8*b* show diagrams illustrating the attenuation of the circuit comprising a RC-bridge versus frequency, Figs. 10 and 11 show the output level-frequency characteristics of two circuits according to the invention, and Figs. 12, 13, 14, 15, 16 and 17 show circuits illustrating the principles of the invention.

The arrangement according to the present invention is schematically shown in Fig. 1, where $m$ designates an amplifier having an amplification factor $m$, $b$ a 4-terminal network having an attenuation $b$ of complex value and $a$ a negative feedback 4-terminal network producing an attenuation or an amplification of the value $a$. For simplicity's sake in the present description the values chosen for $m$ and $a$ are simple and independent of frequency in the range considered. It can easily be shown that the amplification of the whole arrangement has the following value:

$$A=\frac{mb}{1+amb}$$

Substituting $b$ by the expression $c+jd$ results in:

$$A=m\frac{c+am\,(c^2+d^2)+jd}{(1+amc)^2+a^2m^2d^2} \qquad (1)$$

the magnitude of which is.

$$|A|=m\sqrt{\frac{c+am(c^2+d^2)^2+d^2}{(1+amc)^2+a^2m^2d^2}}=m\sqrt{\frac{c^2+d^2}{(1+amc)^2+a^2m^2d^2}} \qquad (2)$$

As long as $amb$ is large compared with the unity it is the negative feedback circuit $a$ which controls the amplification A, which is then substantially equal to ½; but when $b$ is very small A becomes likewise very small. In order to show more clearly how A varies with $c$ and $d$ we are now determining the curves in function of $c$ and $d$ giving an amplification of a given value $n$. This leads to:

$$m\sqrt{\frac{c^2+d^2}{(1+amc)^2+a^2m^2d^2}}=n$$

which may be written as follows:

$$c^2+d^2=\frac{2acn^2}{m(1-a^2n^2)}=\frac{n^2}{m^2(1-a^2n^2)}=0 \qquad (3)$$

This represents the equation of a circle having a radius $$R=\frac{n}{m(1-a^2n^2)}$$

and the centre of which is situated at a distance $$l=\frac{an^2}{m(1-a^2n^2)}$$

from the imaginary axis. We have also $$R-l=\frac{n}{m(1+an)}$$

For $a.n=1$ the circle becomes a straight line parallel to the imaginary axis at a distance $$R-l=\frac{n}{2m}=\frac{1}{2am}$$

From Equation 3 follows that when $a.n>1$, $c$ must always be negative. The circle is therefore situated below the imaginary axis at a distance $$\frac{n}{m(1+an)}$$

Fig. 2 shows graphically this series of circles which is symmetrical to the straight line parallel to the imaginary axis for which $a.n=1$.

The critical point N (Nyquist point) is situated on the real axis at a distance $$-c=\frac{1}{am}$$

from the imaginary axis, so that $1+amc=0$.

In fact we obtain then $d=0$ and $$A=\frac{mc}{1+amc}=\infty$$

Fig. 3 shows more in detail this series of circles for the case where $a=1$. It is seen from this figure that for a large portion of the space the amplification is comprised within 0 decibles and $-1$ decible.

Let us now examine the case where $b$ represents the attenuation of a RC-bridge as shown in Fig. 4. We consider especially the case where for a certain frequency hereafter termed "resonance frequency" the impedance of the arm $R_1C_1$ is equal to that of the arm RC. In this case $R_1=2R$ and $$C_1=\frac{C}{2}$$

The resonance frequency $f_r$ is given by the following formula:

$$f_r=\frac{1}{2\pi CR}$$

Let K be the ratio $$\frac{f}{f_r}$$

it is of any frequency with respect to the resonance frequency. It can be shown then, that for a very large output impedance the attenuation of such a bridge is given by:

$$\frac{e}{E}=\frac{0.5(K^2-1)(K^2-1+4JK)}{(K^2-1)^2+16K^2} \quad (4)$$

The polar diagram illustrating this attenuation has the shape of a circle of radius 0.25 and of which the centre is located on the real axis at a distance of 0.25 from the imaginary axis as shown in Figs. 5 and 9A.

For $f=0$ and therefore $K=0$ this vector has the value 0.5. For $f=f_r$, it is $K=1$, the vector becomes 0, and for $f=\infty$ it is $K=\infty$ the vector has again the value of 0.5.

If this bridge circuit is now used as 4-terminal network in Fig. 1, $$b=\frac{e}{E}$$

and from Equation 4 we obtain:

$$c=\frac{0.5(K^2-1)^2}{(K^2-1)^2+16K^2} \quad (5)$$

$$d=\frac{2JK(g^2-1)}{(K^2-1)^2+16K^2} \quad (6)$$

In Fig. 3 this diagram is shown in dashed lines for scales corresponding to the values $m=10$, $m=20$ and $m=40$ for the amplification factor. Thus it can be seen that when K varies from 0 to 1 this diagram is located, for example, for $m=40$, in the region where the amplification $n$ is included between 0 and $-1$ db up to a value of K of about 0.85. Then it intersects rapidly the circle corresponding to the amplification $-2$, $-3$ etc. The more $m$ is large, the more the region where the amplification varies rapidly is restricted to values of K near 1.

It is possible to calculate the value of $m$ for a given value of $n$ corresponding to a given value of K. Let us assume that for $$K=1.05\left(\text{or } \frac{1}{1.05}\right)$$

it is desired that $n$ reaches $\frac{9}{10}$ of the value $$\frac{1}{a}$$

From Equations 5 and 6 the values of $c$ and $d$ corresponding to $K=1.05$ can be computed. Then the value of the product $a.m$ is computed by means of Equation 3.

The following table shows some computed values

| $n=0.9\frac{1}{a}$ for K | Value of a. m. | Maximum attenuation for— | |
|---|---|---|---|
| | | $C_{min.}=0.0001$ | $C_{min.}=0.001$ |
| 2 | 23 | 53 | 33 |
| 1.5 | 30 | 50 | 31 |
| 1.2 | 56 | 45 | 25 |
| 1.1 | 94 | 41 | 21 |
| 1.05 | 177 | 35 | 16.5 |
| ------ | 1,000 | 21 | 6 |

The maximum attenuation is theoretically infinitely large, but practically it depends of the maximum balance which can be obtained between the arms of the bridge. In order to give numerical examples, the minimum value of $c$ has been assumed to be at best 0.001 or 0.0001 and $d$ having been supposed to be 0. The amplification is then $$A=\frac{mc}{1+amc}$$

It is possible to proceed to an exact regulation at the moment when the circuit is utilised or to obtain an automatic regulation by connecting in series or in parallel to one of the bridge resistances a lamp or other circuit element whose resistance is controlled by the output voltage. The following table shows that the more the cut-off is abrupt, the more the maximum attenuation at the resonance frequency is small. For various selective curves it might be therefore necessary to connect two circuits in series in order to double approximately the attenuations.

The following table shows as example the values of A for different values of K for the case where $m=30$, 177 and 1000.

[$m=30$]

| K | A | \|A\| | db |
|---|---|---|---|
| 1 | 0 | 0 | |
| 1.005 | 0.0015+j0.037 | 0.037 | 28.5 |
| 1.01 | 0.0059+j0.074 | 0.074 | 22.5 |
| 1.02 | 0.023 +j0.145 | 0.146 | 17 |
| 1.05 | 0.12 +j0.32 | 0.36 | 9 |
| 1.1 | 0.345 +j0.45 | 0.57 | 5 |
| 10.— | 0.94 +j0.024 | 0.94 | 0.5 |
| ∞ | | 0.94 | |

[$m=177$]

| K | A | \|A\| | db |
|---|---|---|---|
| 1 | 0 | 0 | *db* |
| 1.005 | 0.046+j0.21 | 0.214 | 13.4 |
| 1.01 | 0.164+j0.37 | 0.405 | 8 |
| 1.02 | 0.435+j0.49 | 0.655 | 4 |
| 1.05 | 0.82 +j0.375 | 0.9 | 1 |
| 1.1 | 0.94 +j0.22 | 0.965 | 0.3 |
| 10.— | 0.99 +j0.004 | 0.99 | 0.1 |
| ∞ | | 0.99 | |

[$m=1000$]

| K | A | \|A\| | db |
|---|---|---|---|
| 1 | 0 | 0 | *db* |
| 1.005 | 0.605+j0.49 | 0.77 | 2.3 |
| 1.01 | 0.86+j0.345 | 0.913 | 0.8 |
| 1.02 | 0.955+j0.193 | 0.974 | 0.2 |
| 1.05 | 0.992+j0.081 | 0.995 | 0.1 |
| 1.1 | 0.997+j0.042 | 0.998 | 0 |
| 10.— | 0.998+j0.0008 | 0.998 | 0 |
| ∞ | | 0.998 | |

The above values are graphically shown in Figs. 6, 7 and 8. In comparison therewith Fig. 9 shows the polar diagram of the RC-bridge alone. It is clearly seen that for values of K included between 1 and 1.1 the vector representing the bridge attenuation remains very small and forms an angle of approximately 90°, but that the vector representing the amplification of the complete circuit becomes very large and changes considerably its direction especially if the amplification is high.

As already mentioned $a$ may be larger than unity, and in this case an amplifier or a transformer must be provided in the feedback circuit. To sum up it is seen that the circuit according to the invention has the feature of producing an amplification which is nearly constant and equal to $$\frac{1}{a}$$

provided that the product $a.m$ is larger than compared to unity. The amplification will be the larger the smaller $a$ is, but in this case a higher value for $m$ is required. The amplification of the circuit may abruptly decrease to a very low value for the resonance frequency of the bridge, or in general when $b$ becomes very small.

This circuit therefore permits to obtain a very small band filtering. The central frequency of the filtered band may be changed in the case of a RC-bridge by changing two elements of this bridge. It is possible to vary the shape of the characteristic by modifying $m$ or $a$ or modifying the bridge elements. For a given value of $a.m$ the output level for frequencies remoted from the resonance frequency varies inversely with $a$.

If the 4-terminal network in series with the amplifier as a characteristic such that $c$ may become negative, the characteristic of the circuit may for example have the shape indicated by Fig. 10. This may occur if this characteristic of the 4-terminal network intersects the straight line giving the amplification for $a.n=1$. One can then engage only in the dangerous region located near the critical point N of Fig. 2. Such a characteristic may be obtained for example by connecting two or more RC-bridges in series. In the case where two complete circuits are connected in series the base of the cut-off may slightly be widened by choosing the resonance frequencies slightly different for the two circuits. The final characteristic will then have the shape shown in Fig. 11. By utilising a plurality of series connected circuits the band may still more be widened.

It is also possible to remove these resonance frequencies so as to obtain two or more well-separated minimae. Similar effects may be obtained by means of series 4-terminal network having one or more attenuation maxima.

In certain cases it might be desired to insert in a feedback circuit a 4-terminal network whose attenuation varies with frequency and which might eventually be identical to that connected in series with the amplifier. In this case the advantage of a nearly constant level outside the filtered band will partially be lost. This feedback circuit may for example have attenuation maxima at predetermining frequencies. The shape of the output level-frequency characteristic might in this case be modified by a modification of the 4-terminal networks and (or) by changing the amplification factor.

Figure 13:
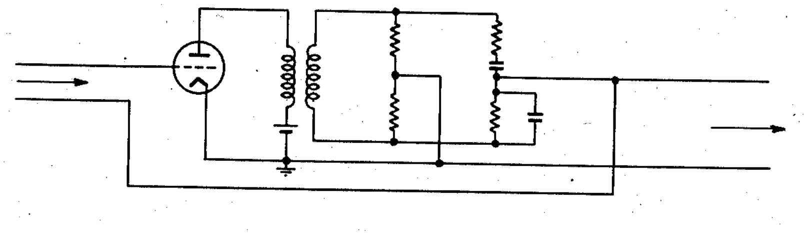
Figure 12:
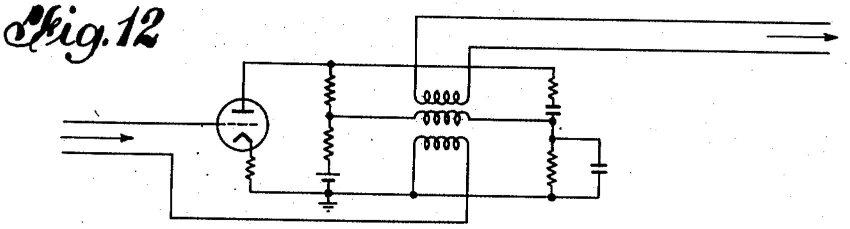
Figure 6A:
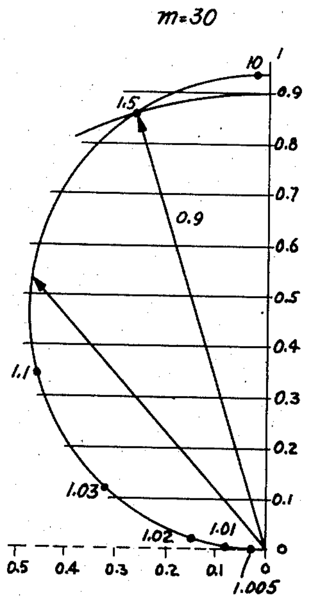
Figure 6B:
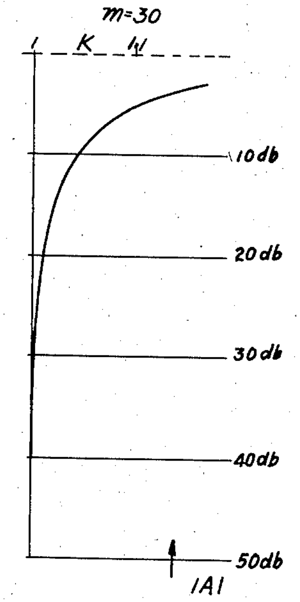
Figure 7A:
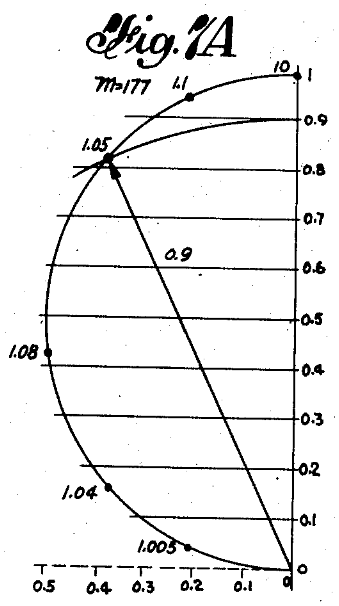
Figure 7B:
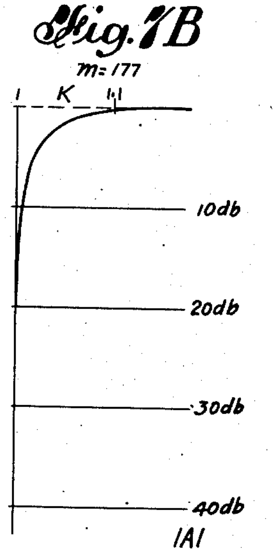
Figure 8A:
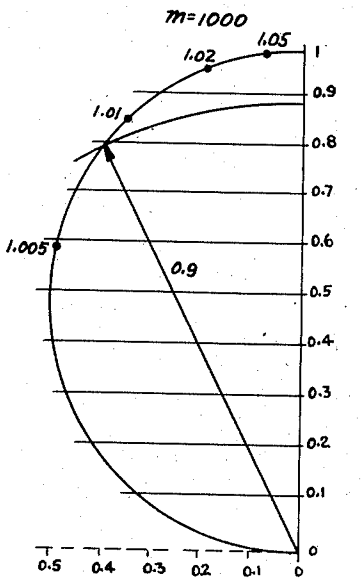
Figure 8B:
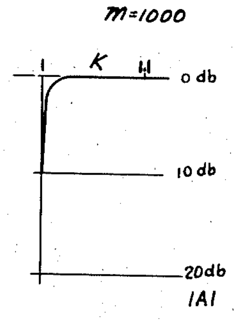

Figs. 12 and 13 show two ways how to design practically the principal schematic diagram which has just been discussed theoretically.

For the balance of the bridge it is obviously necessary to take into account the parasitic capacities. With this respect the circuit of Fig. 13 is preferable to that of Fig. 12. As already mentioned two circuits of this type may be connected in series. A second one may have a higher amplification so that to obtain a satisfactory output level, or alternatively an amplifier may be connected in series.

Figure 14:
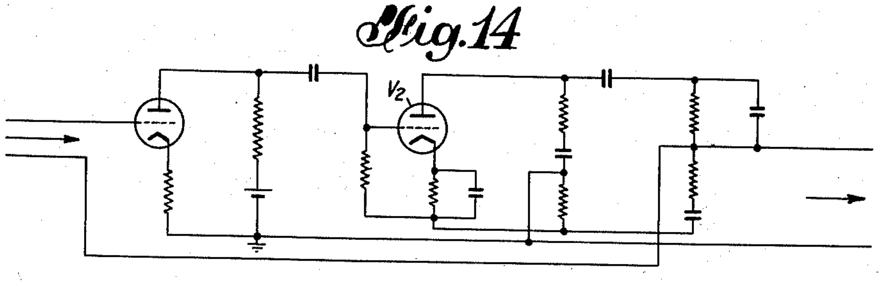

Fig. 14 shows by way of example a circuit without transformer. This latter rises in fact to introduce at certain frequencies phase variations detrimental to the stability. The second valve $V_2$ constitute principally a coupling element, its contribution to the total amplification being rather weak. The impedance at the output of the bridge should be preferably very high in all the circuits.

Figure 15:
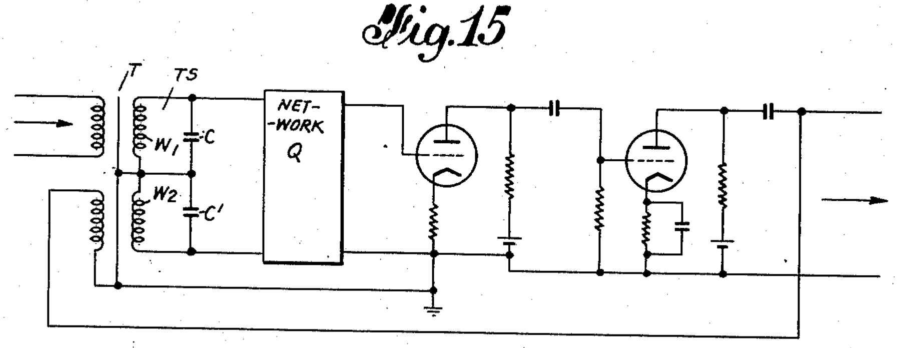
Figure 16:
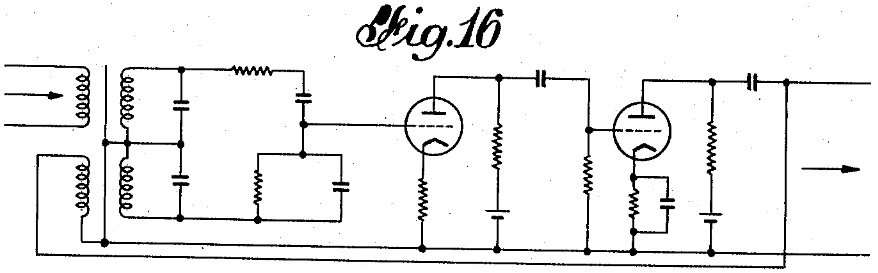

To fulfil this condition a 4-terminal network Q may be placed before the amplifier as shown in the example of Fig. 15. In this case an input transformer T will be used whose secondary winding TS is carefully balanced with respect to ground. The figure shows two condensers C and C′ which may contribute to obtain this balance. If the 4-terminal network consists of a single RC-bridge, the circuit of Fig. 16 may be employed. The two resistance arms of the bridge may then be omitted, the two halves $W_1$ and $W_2$ of the secondary winding TS being a substitution therefore.

The value of $a$ may be higher than unity by changing a suitable transformation ratio for the feedback winding of the transformer. It is understood that other manners of coupling the feedback may be employed.

Figure 17:
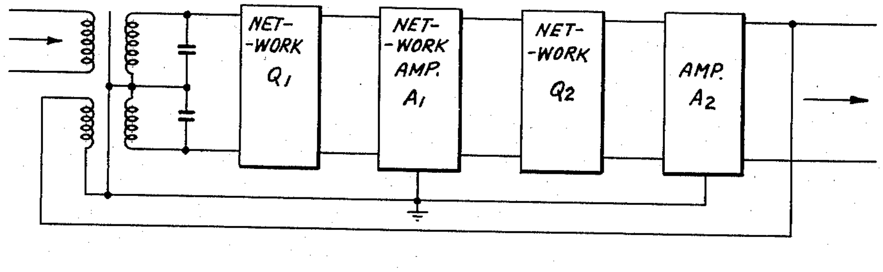

In this case where a plurality of 4-terminal networks $Q_1$, $Q_2$, etc. are employed and where the amplification must be very high two or more amplifiers $A_1$, $A_2$ etc. may be provided and arranged as indicated in principle in Fig. 17.

I claim:

1. A frequency selective electrical arrangement comprising at least one amplifier, a four-terminal network having one pair of terminals connected in series with said amplifier, said network having between the other terminals of said network an impedance that varies with frequency, and a second four-terminal network having constant attenuation with phase shift, one pair of terminals of said second network being coupled to said other terminals of said first-mentioned network and the other pair of terminals of said second network being connected to provide negative feedback for said amplifier.

2. An arrangement according to claim 1 in which said first-mentioned four-terminal network has between said other terminals thereof an impedance that is a minimum for a single frequency.

3. An arrangement according to claim 1 in which said first-mentioned four-terminal network has between said other terminals thereof an impedance that is a minimum for several frequencies.

4. An electrical arrangement according to claim 1 in which said first-mentioned four-terminal network comprises two arms of resistances connected in series between a pair of diagonal terminals and an arm of a series connection of a resistance and a condenser and an arm of a parallel connection of a resistance and a condenser.

5. An electrical arrangement according to claim 1 in which said first-mentioned four-terminal network is connected by one pair of said terminals across the output circuit of said amplifier.

6. A frequency selective arrangement comprising an amplifier having an input and an output circuit, a four-terminal network comprising two arms of resistances, an arm of a resistance and condenser connected in series and an arm of a resistance and condenser connected in parallel, said two resistive arms being connected in series between one pair of diagonal terminals of said network, said one pair being connected across said output circuit, an inductance coil being connected between the other pair of diagonal terminals of said network, a load circuit coupled to said coil, and a second coil coupled to said first-mentioned coil and connected in series with said input circuit whereby all said selectivity is obtained in said four-terminal network connected in series with said amplifier.

7. An electrical arrangement according to claim 1 in which said first-mentioned four-terminal network is connected by one pair of terminals across the input circuit of said amplifier.

8. An electrical arrangement comprising at least one amplifier having an input and an output circuit, a four-terminal network comprising two arms of inductances, an arm of a series connection of a resistance and a condenser and an arm of a parallel connection of a resistance and a condenser, said two inductive arms being connected in series between one pair of diagonal terminals, the other pair of diagonal terminals being connected across said input circuit, and an inductance coil connected across said output circuit and coupled between said one pair of diagonal terminals, whereby all the frequency selectivity is obtained in said four-terminal network connected in series with said amplifier.

STANISLAS VAN MIERLO.

REFERENCES CITED

The following references are of record in the file of this patent:

UNITED STATES PATENTS

| Number | Name | Date |
|---|---|---|
| 2,102,671 | Black | Dec. 21, 1937 |
| 2,170,046 | Anderson et al. | Aug. 22, 1939 |
| 2,173,426 | Scott | Sept. 19, 1939 |
| 2,188,671 | Wilson | Jan. 30, 1940 |
| 2,224,580 | Wise | Dec. 10, 1940 |
| 2,281,312 | Krist | Apr. 28, 1942 |
| 2,370,483 | Muffly | Feb. 27, 1945 |
| 2,412,995 | Levy | Dec. 24, 1946 |